Feb. 26, 1957  M. C. COPOLD  2,782,574
WORK HOLDER
Filed Sept. 16, 1954  2 Sheets-Sheet 1
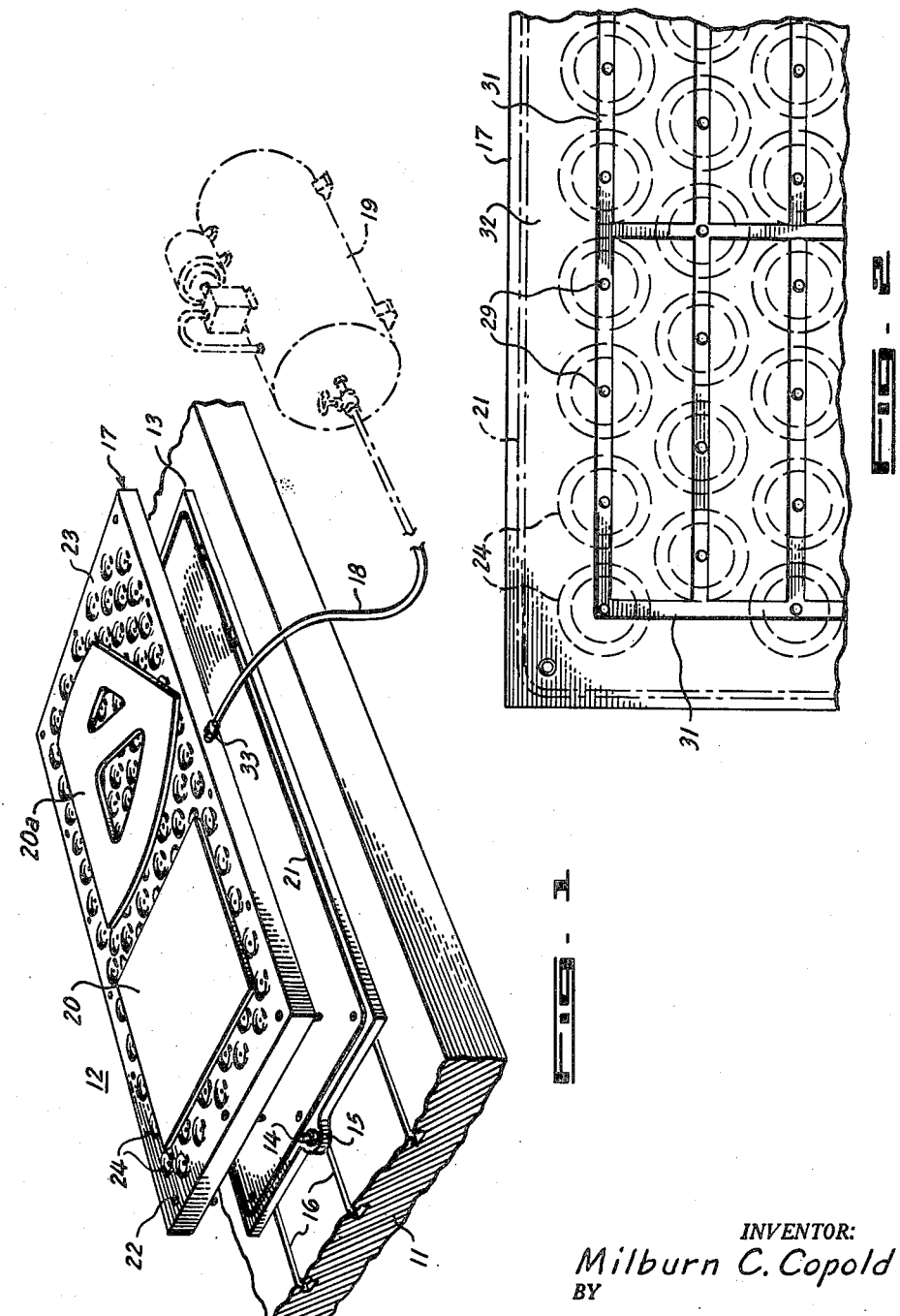
INVENTOR:
Milburn C. Copold
BY
ATTORNEY Feb. 26, 1957   M. C. COPOLD   2,782,574
WORK HOLDER
Filed Sept. 16, 1954   2 Sheets-Sheet 2
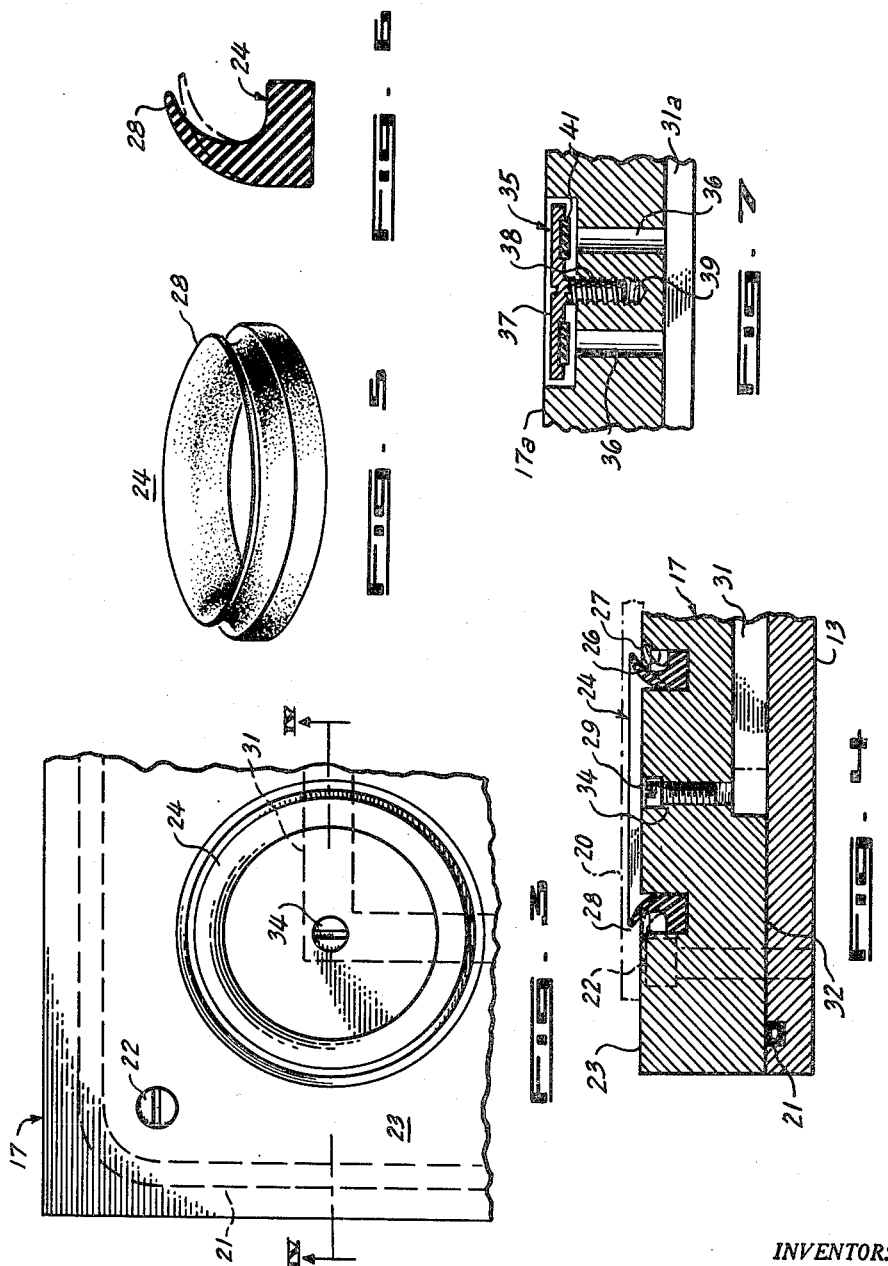
INVENTOR:
Milburn C. Copold
BY
ATTORNEY United States Patent Office 2,782,574
Patented Feb. 26, 1957

2,782,574

WORK HOLDER

Milburn C. Copold, San Diego, Calif., assignor to General Dynamics Corporation, San Diego, Calif., a corporation of Delaware Application September 16, 1954, Serial No. 456,504

3 Claims. (Cl. 51—235)

The present invention relates to a work holder and more particularly to a work holder which embodies vacuum means for maintaining work in position.

Various means are to be found in the prior art for holding a work piece or a plurality of work pieces in the desired location upon the working surface of a machine tool such as a milling machine, grinding machine, shaper of the like. Clamps, vises, electromagnetic holders, and vacuum holders have been and are used extensively for this purpose. The present work holder however, embodies an advance over these devices in affording an effective construction which is better adapted than known devices for quickly and efficiently holding successive, irregularly shaped, large area, and non-ferrous work pieces such as aluminum sheet stock in position upon a machine tool, especially in those cases wherein the sheet stock must be machined to extremely close tolerances. Such precision machining requires that the stock be maintained upon the working surface of the machine tool in a flat and parallel relationship, with the undersurface of the sheet stock securely held throughout substantially its entire area so as to prevent buckling or uneven disposition of the stock.

Vacuum work holders presently used are generally either of that type which is permanently adapted for use in connection with a work sheet of one predetermined size, or are of that type which may be used with work sheets of various irregular shapes only at the expense of successive time consuming or complicated valving adjustments for determining and controlling the area of vacuum suction. Such holders do not permit quick and efficient multiple production of work sheets of successively varying shape and size.

Accordingly, the work holder of the present invention provides a means for maintaining work pieces or work sheets in a desired position upon a machine tool or the like regardless of the metallic or non-metallic nature of the sheets, and regardless of the size and shape thereof. Generally the present work holder comprises a pair of plates, the upper of which is provided with a plurality of suction passages interconnecting with a plurality of gripping means carried by the upper plate and adapted to engage the work sheet. These gripping means are also adapted to be simply and quickly selectively operated so that when a work sheet of irregular shape, including a work sheet having holes or cut away portions therein, is disposed over the surface of the upper plate of the work holder, the gripping means which are found to be located beyond the perimeter of the work sheet may be quickly rendered inoperative by selective blocking thereof to thereby prevent undesirable leakage of air. Thus the work sheet is rigidly maintained in the desired position by the vacuum of those gripping means which are covered by the work sheet. Where multiple production operations are involved it will be evident that the construction of the present work holder admits of quick and simple adjustment to accommodate successive work sheets of various shapes and sizes, such adjustment being accomplished, as before, by selectively stopping the operation of certain of the gripping means of the holder.

It is to be understood that the present work holder is adapted to hold a variety of work pieces and work sheets securely in position, and the apparatus is not therefore to be limited in scope to the particular application hereinafter to be described, nor is it to be limited to the holding of work sheets of non-ferrous composition and irregular shape.

It is therefore a principal object of the present invention to provide an improved work holder for securely holding a work piece or work sheet in position by means of vacuum force.

Another object of the invention is to provide a novel work holder which is capable of use in multiple production work and which is adapted for holding in a desired position work sheets of successively varying size and shape by quick and efficient adjustments of the work holder.

An additional object of the invention resides in the provision of an improved vacuum work holder for holding a thin work sheet of comparatively large area upon a machine tool in a substantially flat plane for machining thereof and effectively restrained as to prevent buckling of the sheet.

It is yet another object of the invention to provide a novel work holder which embodies gripping means which may be selectively operated as desired.

A further object of the invention is to provide a unique vacuum work holder which is simple and easy to operate, inexpensive to manufacture, and adapted for use with any conventional vacuum pump or other vacuum creating apparatus.

Other objects and features of the present invention will be readily apparent to those skilled in the art from the following specification and appended drawings wherein is illustrated a preferred form of the invention, and in which:

Figure 1 is an exploded perspective view of the work holder in accordance with the invention, the work holder being indicated as attached to the bed of any usual machine tool;

Figure 2 is a plan view of a portion of the underside of the upper plate;

Figure 3 is a detail plan view of one of the suction means in position on the upper plate of the work holder;

Figure 4 is a view taken along IV—IV of Figure 3, and illustrating a form of valving means which may be used with the suction means;

Figure 5 is a detail perspective view of one of the suction or gripping means;

Figure 6 is a partial detail vertical sectional view of the gripping means of Figure 5; and Figure 7 is a detail cross-sectional view of alternative valving means which may be used in the present invention.

Referring to the drawings and more particularly to Figure 1, there is illustrated an embodiment of the vacuum work holder of the present invention which is adapted for use in connection with any usual flat-bed machine tool, a portion of the flat-bed of such machine tool being indicated at 11. The vacuum work holder hereof is designated generally by the numeral 12 and comprises a lower or index plate 13 which is rigidly affixed to bed 11 by means of a pair of T-fittings or T-bolts 14, or the like, disposed through a corresponding pair of projecting ears or portions 15 at the ends of index plate 13. Each of the bolts 14 is held at its lower or T-headed end within a usual and conventional mating T-groove or slot 16 provided in machine tool bed 11, as is well understood by those skilled in the art. The upper and lower surfaces of index plate 13 are coplanar and are made smooth to provide a precision base for an upper plate 17.

Upper plate 17, which is connected by an air line 18 to any suitable vacuum pump 19 (shown in phantom), is disposed against plate 13 with its lower surface in contiguous, close fitting, and airtight relationship with substantially the entire upper surface 23 of plate 13 and with a sealing material or tubular gasket 21 provided in a suitable peripheral groove in the upper surface of plate 13 to insure such an air tight fit. It is noted that gasket 21 could be omitted in the event that it was desired to machine and polish plates 13 and 17 to the degree necessary that they would mate exactly in tight fitting relation; however, for reasons of economy the use of gasket 21 is preferred.

Upper plate 17 is rigidly secured to plate 13 by a plurality of machine bolts 22 which are threadably disposed through suitable openings provided in upper plate 17 and index plate 13. An upper surface 23 of plate 17 serves to support a typical work piece or work sheet 20 which is to be machined, and a plurality of suction or gripping means 24 are provided upon the surface 23 within the area defined by encircling gasket 21 for rigidly maintaining such work sheet 20 in position thereon. The means 24 are arranged in rows upon surface 23 of plate 17 with the alternate rows preferably offset from each other as illustrated.

As best illustrated in Figures 3 and 4, each gripping means 24 is formed of an annular and resilient ring which may be made of any suitable resilient or elastomeric material such as neoprene rubber. Ring 24 is disposed in a cooperating annular groove or slot 26 which is provided in the upper surface 23 of plate 17, it being noted that the depth of slot 26 is slightly less than the depth of ring 24 so that ring 24 is raised a short distance above upper surface 23 to offer an annular resilient surface which is engageable with the under surface of the work sheet to be machined. In addition, a peripheral bevel 27 is provided at the upper edge of the outer wall of slot 26 to accommodate the protruding or raised portion 28 of ring 24 when portion 28 is depressed by engagement with the work sheet. In Figure 4, raised portion 28 is illustrated in phantom in its depressed position and in pressing engagement with the undersurface of work sheet 20, also illustrated in phantom. Figures 5 and 6 particularly illustrate the configuration of ring 24, with Figure 6 indicating in phantom the relative deflection of ring portion 28 when under load. The peripheral engagement of ring portion 28 with the undersurface of work sheet 20 results in the formation of a cylindrical compartment or chamber from which air is evacuated in the operation of the present work holder 12 to develop the holding force which holds the work in position.

A vacuum is created within the chamber formed by the undersurface of work sheet 20 and rings 24 by withdrawing the air through a plurality of vertically extending ports or openings 29, each of the openings 29 being centrally located with respect to the annular recess 26 with which it is associated. As best illustrated in Figures 2 and 4, the various openings 29 are connected to each other at their lower ends by a plurality of interconnecting longitudinally and transversely disposed grooves 31 provided in the undersurface 32 of upper plate 17, grooves 31 forming, in cooperation with the upper surface of index plate 13, channels or passages for the evacuation of air. These interconnecting grooves 31 are evacuated through a tubular fitting 33 which is passed transversely through a lateral edge of upper plate 17 and projects its interior end into and connects one of grooves 31 to the vacuum pump 19 through air line 18. With tubular fitting 33 in position the operation of vacuum pump 19 will produce a vacuum within the space between upper surface 23 and the undersurface of work sheet 20 within the periphery of each of the gripping means 24; this vacuum results in the work sheet 20 being firmly held in position upon upper surface 23, as desired.

It will be evident that in order to accommodate a work sheet of irregular shape, or having cut-out areas therein, such as the type indicated at 20a in Figure 1 as contrasted with a square or rectangular sheet such as work sheet 20 of Figure 1, gripping means 24 must be capable of being selectively operated. That is to say, the vertical openings 29 associated with each of the gripping means 24 must be adapted to be selectively plugged or filled to prevent the flow of air therethrough so that those of rings 24 which are not in complete peripheral contact with the undersurface of the work sheet may be stopped or plugged to prevent air leakage. Thus, it will be evident that those gripping means 24 which are not in contact with the undersurface of the work sheet will be rendered inoperative, while those gripping means 24 in such contact will be operative.

The means for rendering inoperative those of the gripping means 24 which afford no assistance in holding the work piece may take any of several forms, and typical embodiments for effecting this result will next be described. In Figure 4, there is illustrated a valving means taking the form of a common machine screw 34 which is threadably disposed within opening 29 to fill opening 29 and block the passage of air therethrough. An operator may thus insert machine screws 34 where desired to close off the openings 29 of those gripping means 24 which are not in complete contact with the work piece.

The present invention is not limited to the use of a particular valving means, such as machine screws 24, but contemplates the use of other types of valving means. For example, in Figure 7 there is illustrated a member 35 which is adapted for use in connection with a modified upper plate 17a having a pair of openings 36 instead of the single opening 29 provided in plate 17 of the preferred embodiment of the present invention. Member 35 comprises a flat annular head 37 and a shank portion 38 threadably disposed within a blind hole 39 which is located in plate 17a in a position identical with the location of opening 29 in plate 17 of the preferred embodiment of the invention. The undersurface of the annular head 37 of member 35 preferably is provided with a suitable peripheral groove for housing a ring or gasket 41 therein, which gasket 41 may be brought into blocking engagement with the pair of openings 36 provided in plate 17a and which communicate with a plurality of grooves 31a which are identical to the previously described grooves 31 of plate 17.

The operation of work holder 12 of the present invention is simple and efficient and comprises placing one or more pieces or work sheets, such as the work sheets 20 and 20a, upon the upper surface of upper plate 17, it being evident that certain of the gripping means 24 will be engaged by work sheets 20 and 20a while certain others of the gripping means 24 will remain unengaged. The operator then renders inoperative those of the gripping means 24 whose upper peripheral edges are not completely engaged by the undersurface of work sheets 20 and 20a. In this manner, it is noted that a withdrawal of air may be effected through air line 18 to evacuate the grooves 31 and the unblocked openings 29 without there being undesirable leakage of atmospheric air through unengaged or partially engaged gripping means 24. A vacuum may thus be created in each of the chambers formed by the undersurface of work sheets 20 and 20a and each of the gripping means 24 whereby work sheets 20 and 20a are firmly and rigidly secured in position for machining.

After completion of the machining of work sheets 20 and 20a it is obvious that successive work sheets of differing shapes than those illustrated, or, if desired, similar to work sheets 20 and 20a may be effectively processed and readily accommodated upon upper surface 23 of upper plate 17, and gripping means 24 selectively rendered operative or inoperative, as desired, to effect the desired holding action upon such work sheets.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A vacuum work holder comprising a first plate having a plurality of exhaust openings arranged in rows and in staggered relationship, said plate having spaced apart perimetrical, groove-like recesses formed therein located about said openings, flexible gaskets disposed in said recesses and embodying outwardly curving lip portions operative to yieldably engage the undersurface of work to be held when said work is disposed thereover, said lip portions serving upon engagement with the undersurface of said work to block off the outer portions of said recesses to thereby substantially prevent the entry of foreign matter into said recesses, and a second plate forming with said first plate a plurality of communicating passages interconnecting said exhaust openings, said communicating passageways being adapted to permit the exhausting of air therethrough, said exhaust openings adapted to be seelctively blocked by closure means.

2. A vacuum holder for securing work in position, said holder comprising a suction plate having a plurality of threaded exhaust openings therethrough and spaced apart groove-like annular recesses in the work supporting surface of said suction plate, said recesses each having a beveled peripheral surface and each being located in surrounding relationship to one of said threaded exhaust openings, said suction plate having formed in the surface thereof opposite said work supporting surface a plurality of communicating passages interconnecting each of said threaded exhaust openings, a closure plate arranged against said suction plate, securing means for holding said closure plate against said suction plate, said suction plate having a peripheral gasket whereby said closure plate seats tightly against said suction plate under the action of said securing means, and engaging means disposed in said groove-like annular recesses and embodying flexible peripheral lip portions which extend and curve upwardly and outwardly in diminishing cross section from said work supporting surface and which are operative to yieldably bend downwardly into said recesses and into seated relationship upon said beveled peripheral surfaces to prevent crushing thereof by the work upon engagement with the work, each of said threaded exhaust openings being adapted to receive a threaded screw valve whereby said exhaust openings may be selectively blocked to prevent a loss of vacuum through any exhaust opening whose associated lip portions are not completely covered by said work.

3. A vacuum holder for securing work in position, said holder comprising a suction plate having a plurality of exhaust openings therethrough and spaced apart groove-like annular recesses in the work supporting surface of said suction plate, said recesses each having a beveled peripheral surface and each being located in surrounding relationship to at least one of said exhaust openings, said suction plate having formed in the surface thereof opposite said work supporting surface a plurality of communicating passages interconnecting each of said exhaust openings, a closure plate arranged against said suction plate, securing means for holding said closure plate against said suction plate, said suction plate having a peripheral gasket whereby said closure plate seats tightly against said suction plate under the action of said securing means, engaging means disposed in said groove-like annular recesses and embodying flexible peripheral lip portions which extend and curve upwardly and outwardly in diminishing cross section from said work supporting surface and which are operative to yieldably bend downwardly into said recesses and into seated relationship upon said beveled peripheral surfaces to prevent crushing thereof by the work upon engagement with the work, and a plurality of valve members threadably mounted in said suction plate within the areas bounded by said annular recesses, said valve members having peripheral flanges adapted to cover said exhaust openings when said valve members are threaded inwardly whereby there is prevented a loss of vacuum therethrough.

References Cited in the file of this patent

UNITED STATES PATENTS

| Number | Name | Date |
|---|---|---|
| 385,256 | Eggers | June 26, 1888 |
| 1,411,031 | Jackson | Mar. 28, 1922 |
| 1,467,486 | Livingston | Sept. 11, 1923 |
| 1,507,445 | Swanson | Sept. 2, 1924 |
| 1,657,110 | Cronkhite | Jan. 24, 1928 |
| 2,198,765 | Featherstone et al. | Apr. 30, 1940 |
| 2,317,348 | Wekeman | Apr. 27, 1943 |
| 2,443,987 | Morrison | June 22, 1948 |
| 2,446,295 | Morrison | Aug. 3, 1948 |